(12) United States Patent
Shah et al.

(10) Patent No.: US 7,974,925 B2
(45) Date of Patent: Jul. 5, 2011

(54) CONTENT BANK FOR OBJECTS

(75) Inventors: Baiju Shah, Palatine, IL (US); Ryan Horner, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 426 days.

(21) Appl. No.: 12/136,455

(22) Filed: Jun. 10, 2008

(65) Prior Publication Data

US 2008/0243915 A1 Oct. 2, 2008

Related U.S. Application Data

(60) Division of application No. 10/090,550, filed on Mar. 4, 2002, now Pat. No. 7,401,054, which is a continuation-in-part of application No. 09/817,917, filed on Mar. 26, 2001.

(51) Int. Cl.
*G06Q 40/00* (2006.01)
(52) U.S. Cl. .................... 705/51; 707/705; 709/229
(58) Field of Classification Search .............. 705/50–56; 709/201–203, 223–229; 707/609, 689, 705, 707/821
See application file for complete search history.

(56) References Cited

U.S. PATENT DOCUMENTS

| | | | |
|---|---|---|---|
| 5,721,911 A | 2/1998 | Ha et al. | |
| 5,862,325 A | 1/1999 | Reed et al. | |
| 5,892,900 A | 4/1999 | Ginter et al. | |
| 5,941,947 A | 8/1999 | Brown et al. | |
| 6,311,194 B1 | 10/2001 | Sheth et al. | |
| 6,411,949 B1 | 6/2002 | Schaffer | |
| 6,654,754 B1 | 11/2003 | Knauft et al. | |
| 6,697,824 B1 | 2/2004 | Bowman-Amuah | |
| 6,721,716 B1 | 4/2004 | Gross | |
| 6,721,747 B2 | 4/2004 | Lipkin | |
| 6,732,331 B1 | 5/2004 | Alexander | |
| 6,748,447 B1 | 6/2004 | Basani et al. | |
| 6,751,673 B2 | 6/2004 | Shaw | |

(Continued)

FOREIGN PATENT DOCUMENTS

EP 0986010 A2 3/2000

(Continued)

OTHER PUBLICATIONS

McKiernan, Peter, Gearing Up for "HailStorm", slide presentation.

(Continued)

*Primary Examiner* — Mary Cheung
(74) *Attorney, Agent, or Firm* — Vedder Price PC

(57) ABSTRACT

A content bank for objects hosts all information regarding an object and serves as a proxy for that object. The content bank comprises at least one instance of a digital identity corresponding the object. Object identity modules or services are available through the digital identity instance. Via the content bank system, the digital identity instance receives object-related information from a source and targeted to a specific service. Conversely, the digital identity instance also serves to determine when object-related information should be provided to a third party by a given service, or when object-related information needs to be manipulated by one or more services. A multi-mode interface is available for third parties to communicate with the digital identity instance. In this manner, third parties are not only able to access data regarding an object, but are actually able to communicate with an object via the digital identity instance.

5 Claims, 10 Drawing Sheets

U.S. PATENT DOCUMENTS

| | | | |
|---|---|---|---|
| 6,970,869 B1 | 11/2005 | Slaughter et al. | |
| 7,042,851 B1 | 5/2006 | Rahman et al. | |
| 7,680,819 B1 * | 3/2010 | Mellmer et al. | 707/783 |
| 2001/0010046 A1 | 7/2001 | Muyres et al. | |
| 2001/0053949 A1 | 12/2001 | Howes et al. | |
| 2002/0065702 A1 | 5/2002 | Caulfield | |
| 2002/0073012 A1 | 6/2002 | Lowell et al. | |
| 2002/0120501 A1 | 8/2002 | Bell et al. | |
| 2002/0161680 A1 | 10/2002 | Tarnoff | |

FOREIGN PATENT DOCUMENTS

| | | |
|---|---|---|
| WO | 98/01807 A1 | 1/1998 |
| WO | 99/22501 A1 | 5/1999 |
| WO | 00/65763 A2 | 11/2000 |
| WO | 01/15001 A2 | 3/2001 |

OTHER PUBLICATIONS

European Patent Office: International Search Report for International Application No. PCT/IB03/01565; dated Dec. 2, 2003, pp. 10-7.

European Patent Office: International Search Report for Internaitonal Application No. PCT/US02/09102; dated Nov. 13, 2003, pp. 1-11.

Ching, Neil, et al.: "Authorization in the Digital Library: Secure Access to Services across Enterprise Boundaries"; IEEE 1996; pp. 110-119.

Fredriksson, Martin, et al., "Fargo Technical Description"; University College of Karlskrona/Ronneby; 1997; pp. 1-11.

Kahan, Jose, "WDAI: A simple World Wide Web distributed authorization infrastructure"; Computer Networks; 1999; pp. 1599-1609.

Edwards, Keith: "The Five Key Concepts of Jini", Jun. 1999.

Czerwinski, Steven E., et al., "An Architecture for a Secure Service Discovery Service"; University of California; pp. 24-35, Aug. 1999.

Ternullo, Noah, et al.: "Info Flo: A Novel Communication Infrastructure for Personal Digital Assistants"; IEEE, pp. 448-453, 2000.

Gitsels, Martin et al.,: "Profile-based Service Browsing—a Pattern for Intelligent Service Discovery in Large Networks"; Siemens AG, pp. 1-3, Aug. 2000.

Gribble, Steven D., et al.: "The Ninja Architecture for Robust Internet-scale systems and services", Computer Networks; pp. 473-497; 2001.

* cited by examiner

CONTENT BANK FOR OBJECTS

CROSS-REFERENCE TO RELATED APPLICATION

The instant application is a divisional of U.S. patent application Ser. No. 10/090,550 filed Mar. 4, 2002 and entitled CONTENT BANK FOR OBJECTS, which application is a continuation-in-part of U.S. patent application Ser. No. 09/817,917, entitled METHODS AND APPARATUS FOR PROCESSING DATA IN A CONTENT NETWORK and filed Mar. 26, 2001, the entire disclosure of which are hereby incorporated herein by this reference.

FIELD OF THE INVENTION

The present invention relates to the transfer of object-related information across one or more physical networks and, in particular, to a method and apparatus for processing object-related information in content networks thereby facilitating management of direct interactions with objects.

BACKGROUND OF THE INVENTION

It is common for entities (i.e., individuals or institutions) that are separately involved in the manufacturing, selling, utilizing and servicing of objects to separately possess information about such objects that may be of use to other entities. Conversely, entities that could benefit from access to certain types of object-related information routinely cannot obtain such information because it is in the possession of other entities with which they have no regular channel of communication. Entities are often required to go through time consuming and burdensome steps to obtain information about objects possessed by other entities.

The resulting inefficiencies are manifested in numerous ways. Companies that embed sensors in their equipment often do not have the capability to exploit that data for improved business results. For example, many industrial equipment manufacturers equip their products to provide Global Positioning System (GPS) data, but are typically unable to use such data in a meaningful way. As an extension of this problem, dynamic process interactions are often not conducted with the greatest possible efficiency. For example, underutilized truck fleets are a common occurrence because freight customers are often not aware of available cargo space.

In another scenario, a company's lack of knowledge about how customers use that company's products prevents that company from improving its product design and customer service. Further still, a lack of structured and aggregated information about certain types of objects can lead to further inefficiencies, e.g., lack of information about device status and usage can lead to faulty or redundant warranty claims.

As a particular example of these problems, consider that a bus manufacturer may possess information regarding a given bus' manufacturing history. The bus itself may contain information such as engine error codes, and the owner of the bus may possess warranty information and service contacts. In order to repair the bus, the owner of the bus may have to research warranty information and service contacts, and a service center may have to read error codes and contact the manufacturer for information about the product history. All of these steps increase the downtime of the bus and reduce the overall efficiency of the bus. Moreover, the bus manufacturer has an incomplete view of the bus and its use because the error codes and other usage data are not available to them, resulting in poor customer service and poor product design.

Recently, Microsoft Corporation announced its plans for its .NET My Services (formerly code-named "Hailstorm") web-based services. .NET My Services will provide a platform for unifying an individual's data across devices and making the data accessible to the user and to other services in a secure fashion. Organized around individual users, rather than the devices that such users may use, .NET My Services will function to deliver personally relevant information through the Internet to a user, to software running on the user's behalf, or to devices working for the user. In implementation, .NET My Services will rely on Microsoft's Passport service to provide user identification. The user controls access to and usage of information associated with his or her identity. As designed, .NET My Services platform uses an open access model thereby allowing use with any device, application or service, regardless of the underlying platform, operating system, object model, programming language or network provider. All .NET My Services are XML (Extensible Markup Language) Web services, which are based on the open industry standards of XML and SOAP (Simple Object Access Protocol).

Also, the MIT Auto-ID Center provides a strategy for assigning unique identifiers to each object, or product, in existence. This strategy manifests itself in the form of Electronic Product Codes (EPCs) that can be assigned to give each object a unique identity. The EPC works with the Object Naming Service (ONS) and tells computer systems where to find information about any object that carries an EPC code. The ONS is based in part on the Internet's existing Domain Name System (DNS), which routes information to appropriate web sites. The ONS would allow computer systems to find a physical markup language (PML) file for each item with an EPC.

While it is anticipated that the .NET My Services platform will represent an advance in the management of data of individuals, it fails to address the management of object-related data. Furthermore, although EPCs will likely serve well to uniquely identify objects and relate them to a specific PML description of that object, they fail to offer object-centric services that allow objects to interact with the world. As objects become increasingly capable of generating their own data and requesting services, the need for such object-related information management will likewise increase. Therefore, a need exists for methods and systems that provide a central point for hosting and managing object-related information as well as receiving and distributing object-related information to and from a plurality of entities.

BRIEF SUMMARY OF THE INVENTION

The present invention overcomes the problems and limitations of the prior art by providing systems and methods that may be used to receive information relating to objects from a plurality of entities, and to process and distribute the information. In one embodiment, the present invention provides a platform that hosts all information regarding an object and serves as a proxy for that object, thereby providing secure, permission-based content distribution on behalf of the object. Using the disclosed systems and methods, the exchange of information regarding an object between entities may be automated, thereby increasing efficiency. The present invention may be beneficially applied to virtually any type of object. However, it is anticipated that objects most likely to immediately benefit from the present invention will share a plurality of characteristics, including: high cost, easy or frequent mobility, expensive down-time, specialized or outsourced repair or maintenance procedures, numerous components and numerous associated data points. Examples of objects possessing these characteristics include military equipment, medical equipment, factory equipment, farm equipment, cars and trucks, trains, ships, etc.

In one embodiment of the present invention, a content bank system comprising at least one instance of a digital identity corresponding to an object is provided. Preferably, a plurality of object-related services is available through the digital identity instance, which services may be implemented in a centralized or distributed fashion. Via the content bank system, the digital identity instance receives object-related information from a source and targeted to a specific service. When the service is available to the digital identity instance, the object-related information is sent to the service for processing such that the object-related information is thereafter available via the content bank system. Conversely, the digital identity instance also serves to determine when object-related information should be provided to a third party by a given service, or when object-related information needs to be manipulated by one or more services. Access rights and usage permissions are maintained so that third parties are prevented from accessing or using data in a prohibited manner. In a preferred embodiment, a multi-mode interface is available for third parties to communicate with the digital identity instance. In this manner, third parties are not only able to access data regarding an object, but are actually able to communicate with an object via the digital identity instance.

Additional embodiments of the present invention are disclosed herein. In a first embodiment, a method of associating contextual information with discrete components of object-related information is provided. The method includes the steps of accessing at least a first discrete component of object-related information from at least a first data source; and adding object-specific contextual information to the at least a first discrete component of data to provide first enhanced object-related information. In other embodiments, the present invention can be partially or wholly implemented on a computer-readable medium, for example, by storing computer-executable instructions or modules, or by utilizing computer-readable data structures. In a preferred embodiment, the content bank system comprises one or more computer-implemented platforms.

Of course, the methods and systems of the above-referenced embodiments may also include other additional elements, steps, computer-executable instructions, or computer-readable data structures. In this regard, other embodiments are disclosed and claimed herein as well. These and other aspects of the present invention will be more readily apparent with reference to the figures and description below.

BRIEF DESCRIPTION OF THE DRAWINGS

The present invention is illustrated by way of example and not limited in the accompanying FIGS. in which like reference numerals indicate similar elements and in which.

DETAILED DESCRIPTION OF THE INVENTION

Figure 1:
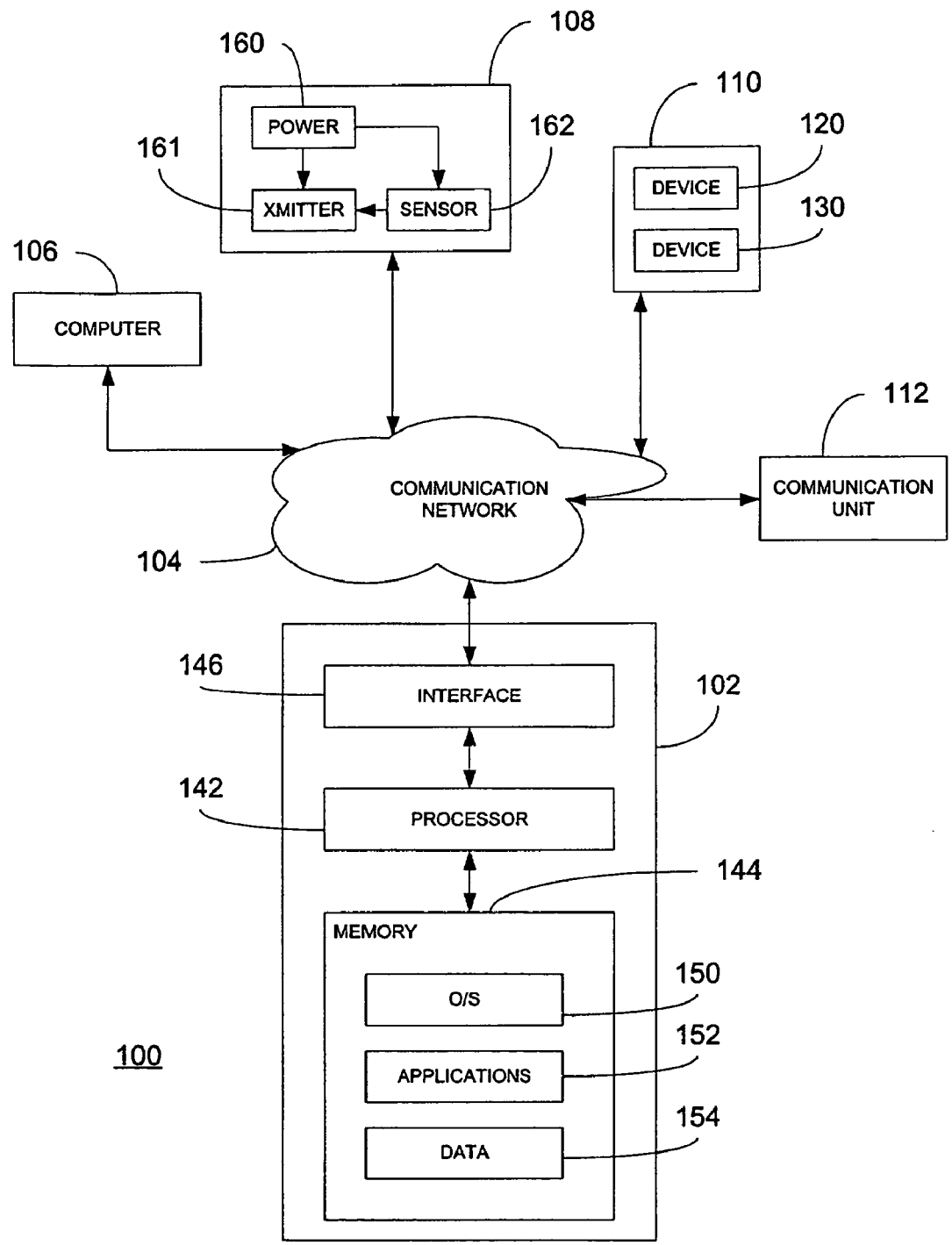
FIG. 1 is a block diagram of a computer-based architecture that may be used to implement aspects of the present invention.

The present invention may be more readily described with reference to FIGS. 1-10. FIG. 1 is a block diagram of a computer-based architecture that may be used to implement various aspects of the present invention. In particular, a system 100 is shown in which a computer 102 communicates with other computers 106 (only one shown), stand-alone sensor-based devices 108 (only one shown), objects 110 (only one shown) as well as communication devices 112 (only one shown) via a one or more communication networks 104.

The computer 102, one or more of which may be used to implement a content bank as described in greater detail below, is constructed in a manner well known to those having ordinary skill in the art. In particular, the computer 102 comprises a processor 142 (such as a microprocessor, microcontroller, digital signal processor or similar devices or combinations thereof) coupled to storage 144 and one or more interfaces 146. The storage 146, which may comprise any combination of volatile short-term (e.g., random access memory) and non-volatile long-term digital memory devices (e.g., read-only memory), comprises computer-readable instructions and/or data such as an operating system 150, one or more applications 152 and operational data 154. The interfaces 146 comprise any combination of hardware, firmware and/or software necessary to communicate with the one or more communication networks 104. For example, the interfaces 146 may comprise an "ETHERNET" card thereby allowing communications via a local area network, or a suitable wireless interface such as a "BLUETOOTH" interface or a satellite interface, to allow communications via a wireless network. Note the use of one or more specific interfaces 146 to communicate via one or more specific communication networks 104 is a matter of design choice and the present invention is not limited in this regard.

The computer 102 communicates with one or more third parties (as that term is used below) embodied by the computers 106, stand-alone sensor based devices 108, objects 110 and communication devices 112. Note that the third parties shown in FIG. 1 are for illustrative purposes only and are not to be considered limiting in this regard; those having ordinary skill in the art will recognize that other embodiments may be equally employed for purposes of the present invention. The computers 106 may comprise typical processor-based devices currently in use, such as personal computers, network servers, etc. As described below, the computers 106 may embody particular entities in possession of and/or desiring to receive information regarding one or more objects. Further still, the computers 106 may embody other content banks capable of communicating with the computer 102.

The stand-alone sensor-based devices 108 illustrated in FIG. 1 are representative of entities of lowest complexity capable of communicating with the computer 102. The stand-alone sensor-based devices 108 comprise a power source 160 coupled to a transmitter 161 and, optionally, a sensor 162. The sensor 162 is coupled to the transmitter 161. In operation, the sensor 162—which may comprise any component capable of assessing its environment or a system to which it is coupled—continuously, periodically or intermittently provides raw data to the transmitter 161 for communication of the raw data to the computer 102 via the communication network(s) 104. As in the case of the interface(s) 146, the transmitter 161 comprises any component necessary to communicate with the relevant network. Alternatively, sensors 120, 130 may be incorporated into more complex objects 110, as shown. In this case, operation of the sensors 120, 130 is coordinated through a control function (not shown) provided by the object 110. Communication of the raw data provided by the sensors 120, 130 to the computer 102 is likewise coordinated by the object 110, as described in greater detail below. Regardless, further functional description of the operation of a content bank and the entities with which it communicates is provided below with reference to FIGS. 2 and 3.

Figure 2:
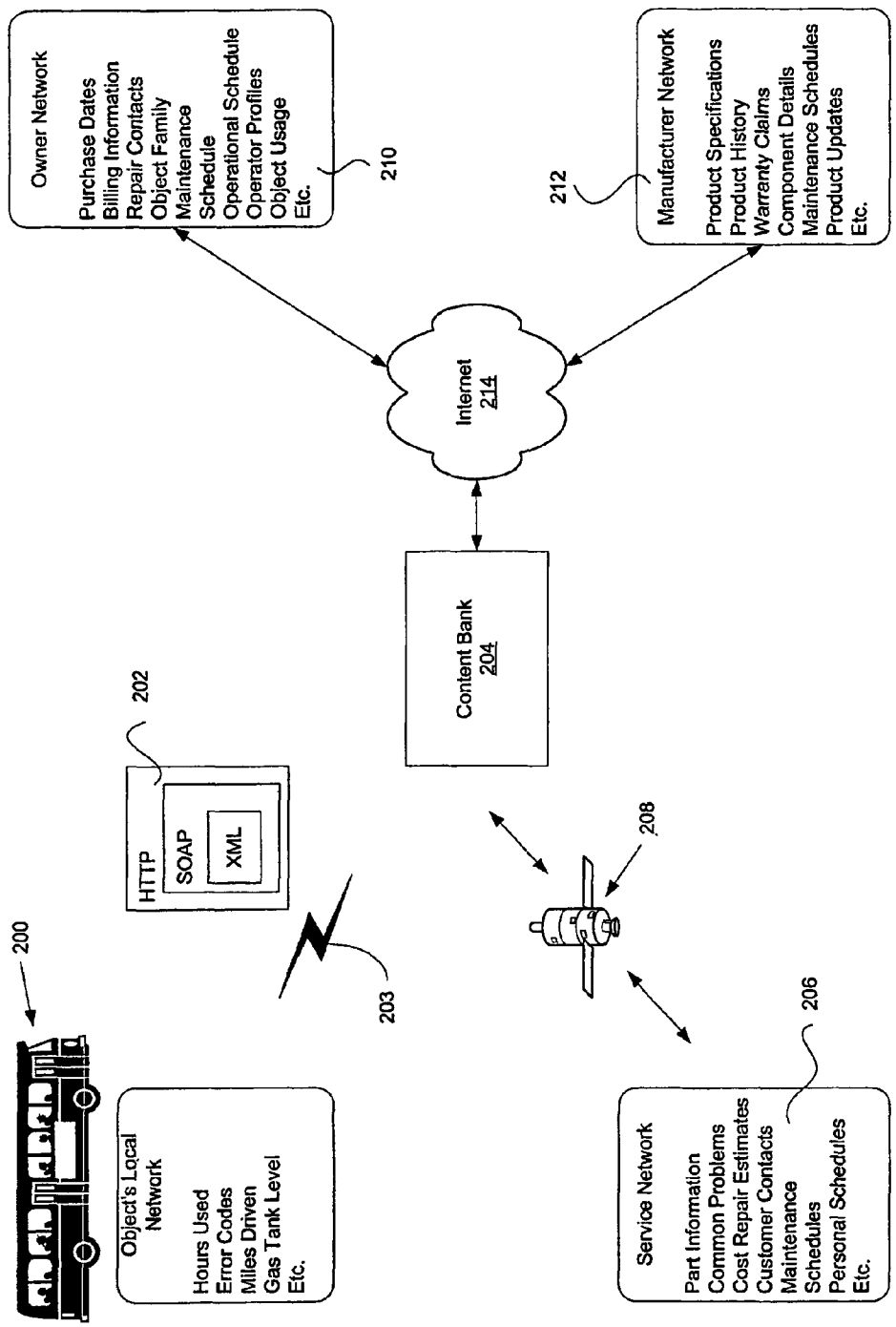
FIG. 2 is a block diagram of a system comprising a content bank and communication connections with a variety of entities in accordance with an embodiment of the present invention.

FIG. 2 illustrates a system that may be used to manage information relating to an object in accordance with one embodiment of the present invention. Beyond managing information regarding the object, the present invention also provides for mediated interactions between objects and third parties, as will be evident from the discussion below. In FIG. 2, the object under consideration is illustrated as a bus 200. However, the present invention may be used in connection with virtually any uniquely identifiable instrumentality having a physical presence including, but not limited to: trains, ships, medical devices, factory or construction equipment, etc. However, "objects" in the context of the present invention need not be limited to things having a physical presence. Any uniquely identifiable entity, the status of which may be determined or with which communications may be established, can be an object that may benefit from the present invention. For example, a software-based process, having no physical presence beyond the computer in which it is executed, may be considered an object. Other examples, equally applicable to the present invention, will no doubt be readily identifiable by those having ordinary skill in the art.

Referring once again to the example illustrated in FIG. 2, the bus 200 may include an onboard computer or network that stores a variety of information such as the hours used, error codes, miles driven, seat availability, gas tank level, etc. The bus 200 may include computer executable instructions for composing a message 202 that includes some or all of this information. The message 202 may be transmitted to a content bank 204 and, in particular, to a digital identity instance representative of the bus 200 provided by the content bank 204, as described in greater detail below. The content bank 204 is preferably implemented using a computer platform, such as the computer 102 illustrated in FIG. 1. In the example shown in FIG. 2, the bus 200 communicates with the content bank 204 in a wireless manner, such as through a cellular telephone network via a wireless channel 203. In order to intelligently communicate with the content bank 204, the bus 200 could be given an EPC, which would uniquely identify it in the world and would use a system like ONS to reference the content bank and its corresponding service set. Note that the use of EPCs via the ONS system is but one technology that may be used for this purpose, and the present invention is not limited in this regard.

A service network 206 may contain information such as part information, common problems, repair cost estimates and other information that may be relevant to the servicing of the bus 200. FIG. 2 shows an embodiment in which the service network 206 wirelessly communicates with content bank 204 via a satellite 208.

Networks belonging to the owner of the bus 200 may also contain relevant information. For example, an owner network 210 may include information such as purchase dates, billing information, repair contacts and other information relevant to the use and maintenance of the bus 200. A manufacturing network 212 may also include relevant information such as product specifications, product history, warranty claims and other information relevant to the use and maintenance of the bus 200. FIG. 2 shows an embodiment in which the owner network 210 and the manufacturer network 212 communicate with the content bank 204 via the Internet 214. The communication paths shown in FIG. 2 are merely illustrative of communication paths that may be used by entities to communicate with the content bank 204. The present invention is not limited to the use of the communication paths shown in FIG. 2, or to the particular arrangement of communication paths shown in FIG. 2. Additionally, note that the information types illustrated in FIG. 2 are illustrative only and the present invention is not limited in this regard. Indeed, in practice, the types of information residing in such networks will be strongly dependent upon the type of object under consideration.

Figure 3:
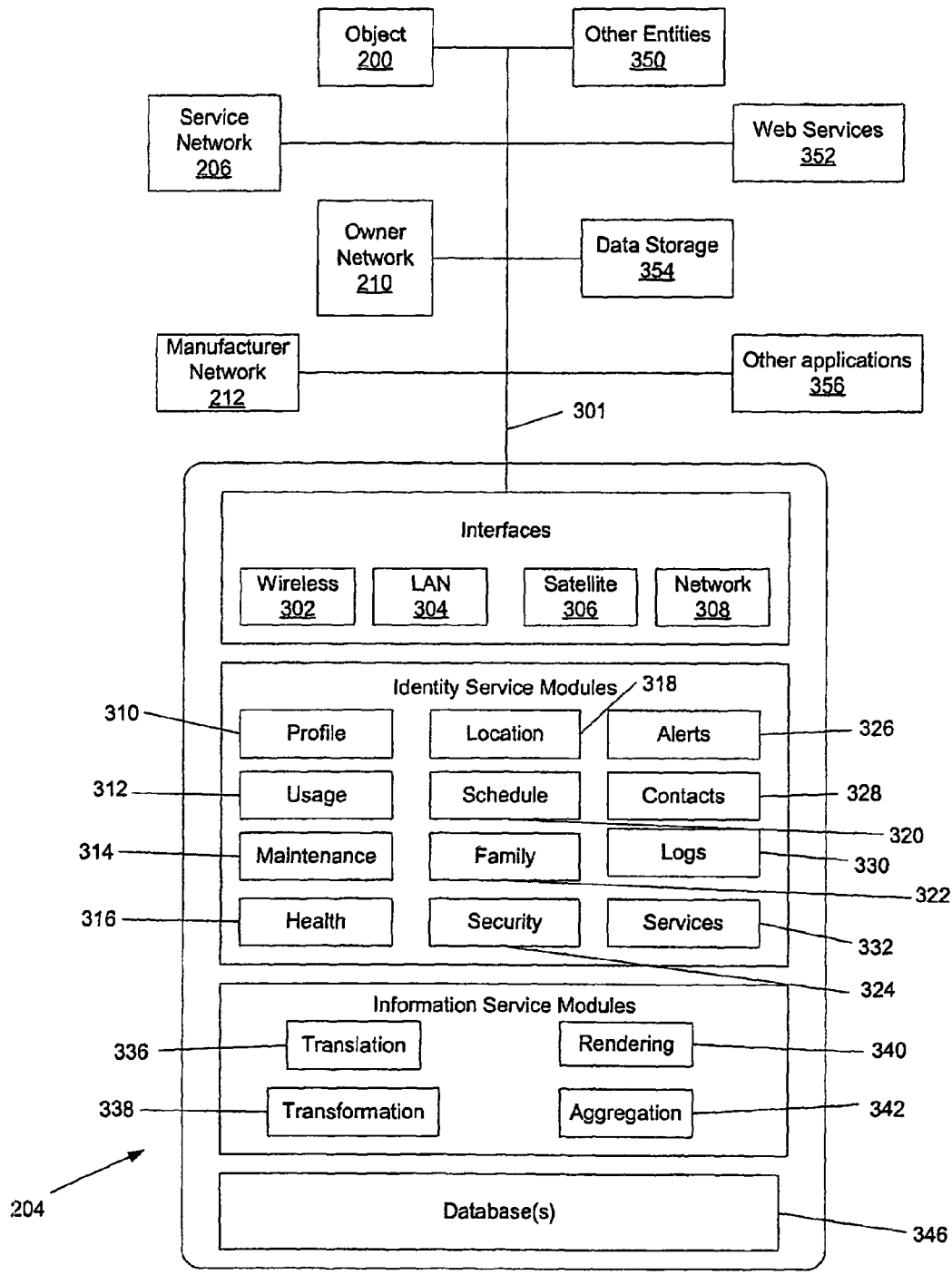
FIG. 3 is a block diagram illustrating components of a content bank as well as various entities in communication with the content bank in accordance with an embodiment of the present invention.

Referring now to FIG. 3, an expanded view of the content bank 204 in accordance with one embodiment of the present invention is illustrated. As mentioned above, the content bank 204 may be implemented with a single computer device or server. In an alternative embodiment, the content bank 204 is implemented with two or more distributed computer devices or servers. Regardless, a group of interfaces 302-308 may be included for communicating with one or more objects 200 as well as a variety of entities and services. In the context of the present invention, an entity comprises any uniquely identifiable individual, institution or instrumentality. Thus, the content bank may communicate with another content bank, an object, a company or other entity via one or more of the interfaces 302-308 and a corresponding access channel 301. (Note that the access channel 301 is representative of a plurality of possible access channels that may operate independently of each other.) For example, a first content bank that hosts the content and digital identity for a truck might be different than a second content bank that hosts the content and digital identity for the packages on the truck. As a result, a third party wishing to determine the status of its package on the truck would first contact the second content bank to determine the status. In so doing, the second content bank would communicate with the first content bank to obtain relevant status information for the truck, for example, the truck's current location.

In particular, FIG. 3 shows that the content bank 204 may communicate with other entities 350 (including other content banks) that are not shown in FIG. 2. Those having ordinary skill in the art will appreciate that the specific entities that communicate with content bank 204 may be a function of the particular object. For example, when content bank 204 is utilized in connection with medical device objects, a hospital network may communicate with the content bank 204 via an EPC, as described previously. The content bank 204 may also communicate with third party applications and services. Web services 352, as known in the art, are typically computer-based services made available for general use via an organization's web-server or other web-connected programs, an may include, for example, object tracking and data processing services. A data storage service 354 may be used to store data in remote locations. In embodiments of the present invention in which the content bank 204 is implemented with more than one computer device or server, the data storage service 354 may be used to maintain data in one central location. A variety of additional or alternative applications and services 356 may also communicate with content bank 204.

Within the group of interfaces 302-308, a wireless interface 302 may be used to communicate with entities and services in a wireless manner. The particular wireless systems or protocols used is a matter of design choice. A local area network (LAN) interface 304 may be included to allow content bank 204 to communicate with entities and services that are coupled to a LAN. In a similar manner as the wireless interface, the satellite interface 306 may also be included for communicating with entities and services via satellite communication channels. Finally, a public/private network interface 308 may be included to allow entities and services to communicate with content bank 204 via a public network (e.g., the Internet or World Wide Web) or private network (e.g., a corporate intranet or extranet) or combination thereof. The content bank 204 may include, as a matter of design choice, a variety of alternative or additional interfaces for communicating with entities and services not otherwise shown in FIG. 3.

The content bank 204 may also include one or more object identity modules 310-332 that may be implemented with hardware and/or computer executable instructions for performing functions such as storing and processing information relating to objects. In one embodiment of the present invention, modules (or services) comprise a set of application code or software that can be instantiated or made available through a Web Services interface, as known to those having ordinary skill in the art. For a given object, each module 310-332 may be instantiated in order to perform one or more specific functions on behalf of that object. Collectively, the instantiations of the object identity modules 310-332 on behalf of the object give rise to a digital identity instantiation corresponding to that object, as describe in further detail below. For any given instantiation, each of the modules 310-332 can take the form of object-related information manipulated by the various object identity modules 310-332. The object-related information is preferably stored in a database 346 that, in implementation, may comprise a single storage device or a plurality of storage devices operating in conjunction. For the purposes of the present invention, object-related information may comprise any data, in any form, originated by, targeted to or in any way concerning objects. Numerous examples of object-related information will be apparent from the several examples described herein.

Within the object identity modules, a profile module 310 maintains information relating to the description of objects, such as: machine version, manufacturer information, model number, stock keeping unit (SKU) number, installed options and owner history. A usage module 312 tracks information relating to the work and usage histories of objects, including, where possible, a usage counter. A maintenance module 314 maintains information relating to the maintenance histories of objects, including a complete repair history. A health module 316 tracks and provides real-time information relating to the conditions of objects and their constituent components, and is therefore the first service to detect any fault conditions of the object. In one embodiment, the health module 316 obtains information from onboard computer and sensor devices (see FIG. 1) that monitor components of objects. As is well known in the art, onboard computer and sensor devices, e.g., sensors, microeletromechanical systems (MEMS), temperature, pressure, global positioning system (GPS) gauges may be used to monitor the systems of objects and generate fault codes when error conditions exist.

The object identity modules may also include a location module 318 that obtains and stores real-time location information of an object, preferably as latitude-longitude coordinates. At least some of objects may be configured to obtain location information via GPS receivers and then transmit location information to the object's instantiation of the location module 318. A schedule module 320 processes information relating to future assignments of objects, including future locations related to such assignments. Additionally, a calendar module 320 is used to schedule future servicing of objects. A family module 322 maintains information descriptive of the hierarchical and communication relationships between an object and others to which it can be related. For example, referring once again to the example of a truck carrying packages, the truck's instantiation of the family module 322 reflects that the packages are being transported by the truck. Conversely, each package's instantiation of the family module 322 maintains information indicating that the package is being transported by the truck.

Modules for communicating with entities may also be included as part of the object identity modules. With such communication capabilities, content banks in accordance with the present invention may essentially act as intermediaries between objects and third parties desiring to communicate with such objects. To this end, a security module 324 maintains and administers access rights, usage rules and/or role templates. As described below, enhanced object-related information in accordance with the present invention comprises usage rules and/or access rights, maintained by the security module 324. Usage rules control usage of object-related information by third parties, whereas access rights determine who is able to receive objected-related information from, or provide such information to, a given object's digital identity instance. Furthermore, role templates define the shape of data that a particular third party could be assigned to an object's services. That is, when a request is made to a service, the third party's role template is referenced to determine the type and quantity of data to be returned, as well as the format of the data to be used when the data is provided to the third party. In practice, usage rules and access rights may be implemented as lists and/or database entries to define particular rules and that also reference style sheets or the like in order to provide any necessary formatting.

An alerts module 326 manages communications between modules within the content bank 204, and between the modules and any external entities and services. A contacts module 328 maintains a list of contacts to whom notifications can be sent. An alerts module 326 serves as the primary point for controlling communications between the digital identity instantiation representative of an object and external entities and services. To this end, the alerts module 326 obtains contact information from a contacts module 328 as needed. For example, the health module 316 may include computer-executable instructions that, upon detecting a fault condition for a given object, cause the health module 316 to instruct the alerts module 326 to notify an entity or service according to contact information maintained by contacts module 328. A logs module 330 maintains access logs of any transactions made between modules or between a module and an external agent or entity.

Finally, a services module 332 is provided as a registry for the other modules. For a given instance of the services module 332 on behalf of an object, the service module 332 lists all of the modules that may be accessed by the object or third parties, and where to find those modules. Note that a given content bank that hosts the service module 332 for a given object might not host all of the services that are relevant to that object. For example, consider a person's car. If that person wanted current health-related information about his/her car, he/she would cause a query to be sent to the instance of the services module 332 corresponding to his/her car to first to determine if that service exists for this object, where the service exists (this could be a universal resource identifier (URI) of the module), and how to interact with it. Where some of the health information is hosted by another content bank, the services module 332 will indicate how to access the other content bank. Thus, in short, the services module 332 shows what modules are available for an object and where those modules reside.

Additional modules not shown in FIG. 3 may be optionally provided as part of object identity modules. A bill of materials (BOM) module may be provided to maintain a listing of all the parts of an object. A state module may be used to track information relating to the real-time operating state of an object, e.g., "standby mode", "55% utilization", "75 MPH", etc. Finally, a documents module may be provided to manage files and documents associated with an object including, for example, operator instructions, legal title documents, etc. In a preferred embodiment, the documents module can maintain pointers, URIs, etc. to the corresponding files and documents.

As noted above, the database 346 may be centralized or distributed. This implies that the object identity modules don't necessarily have to store their corresponding content in a local database—object-related information can be stored across multiple databases. In this case, the relevant module can aggregate the content in real time, as needed. Referring once again to the car example, the maintenance module 314 could render the maintenance history by querying and aggregating data from the database of other content modules and the local database of its content bank.

Particular examples of the functionality of the object service modules illustrated in FIG. 3 are provided below in Tables 1-3. In particular, Table 1 illustrates the operation of the various modules relative to the example of a power meter; Table 2 corresponds to the example of a refrigerated truck; and Table 3 corresponds to the example of a factory machine. Note that the particular module functions shown are for illustrative purposes only and would be subject to change when implemented.

TABLE 1

| Module | Power Meter use of the Module |
| --- | --- |
| Services | Overall registry of the location for all services. All service requests come through this module and are directed to the appropriate location for the actual instance of the service desired. |
| Profile | Maintains serial number, date of production, product version, manufacturer name, model number. |
| Usage | Maintains kilowatt hours that the meter has recorded for some defined time period. |
| Maintenance | Tracks any problems that have occurred as well as any service and updates that have been conducted or installed. |
| Health | Records the current condition of the power meter (functioning or not). If not functioning, it would cause notifications to be sent to the power company indicating what is wrong (which would result in a scheduled repair visit if needed). |
| Location | As a relatively static object, this module would likely maintain an address-based location. Optionally, it could include a proprietary location definition within the power provider's network. |
| Schedule | Maintains dates when the meter was moved in the past or scheduled to move in the future. Maintains dates when the meter needs to be serviced as well. |
| Family | Maintains list of power meters of different capacity and defines the relationship to neighborhood meters. |
| Security | Defines the users, companies, and objects that are able to access this power meter's information. Specifically, the power company and its designated repair employees would have access to its data (read/write). Also, the home owner would receive read-only rights to some portions of the services (e.g., for cost estimation). |
| Alerts | Provides the capability to send alerts to the homeowner and company/repair employees when problems occur. The messages are tailored to the targets based on their role templates and channels of communication. |
| Contacts | Maintains contact information for the homeowner, repairman, backup repairman, and power company representative. |
| Logs | Keeps access logs of any transactions made between services or between a service and an external agent. |
| Bill of Materials | Maintains a listing of all the parts of the power meter, including each particular hardware, software component. |
| State | Contains the recording status of the meter (off/on). |
| Documents | Manages manuals, blueprints, power specifications, I/O flows corresponding to power meter. |

TABLE 2

| Module | Refrigerated Truck use of the Module |
| --- | --- |
| Services | Overall registry of the location for all services. All service requests come through this module and are directed to the appropriate location for the actual instance of the service desired. |
| Profile | Maintains machine version, manufacturer information, model number, SKU, installed options, owner history, driver skill requirements. |
| Usage | Maintains a usage counter for the truck; tracks duration of usage, temperature of refrigerator, cargo being transported, miles traveled, amount being transferred (by weight), etc. |
| Maintenance | Records all truck/refrigerator repair history, including oil changes, gas tank fill-ups, changed tires, or refrigerator component repairs, failures, etc. |
| Health | Tracks and gives real time information about the refrigerator components as well as truck components; reports refrigerator and trailer performance, oil level, gas, tires, engine, etc. |
| Location | Provides real time location of the truck as a latitude-longitude combination, tracks distance to a maintenance crew/destination. |
| Schedule | Keeps track of future assignments of the truck and knows where the truck is scheduled to be in the future and maintains and schedules regular upkeep, maintains delivery schedule, maintains expiration date of transported goods, maintains schedule of truck being used or available. |
| Family | Reports relationship of parts and other devices related to refrigerator and the truck, i.e., for the refrigerator: cooling devices, filters, etc; for the truck: tires, oil, gas, etc. |
| Security | Maintains data sharing rules for the truck's information, user roles, access rights, etc |
| Alerts | Upon detection of problems, sends alerts to appropriate repair entity (truck mechanic or refrigerator technician), alerts driver, alerts destination and |

TABLE 2-continued

| Module | Refrigerated Truck use of the Module |
|---|---|
| | delivery company of status. The messages are tailored to the targets based on their role templates and channels of communication. |
| Contacts | Maintains contact information for truck owner, driver, delivery contact, emergency contacts, etc. |
| Logs | Keeps access logs of any transactions made between services or between a service and an external agent. |
| Bill of Materials | Maintains a listing of all the parts of the truck and refrigerator, including each particular hardware, software component. |
| State | Maintains relevant state information, e.g., "en route", "loading" "un-loading", "capacity available", etc. |
| Documents | Manages warranty documents, refrigerator-related manuals. |

TABLE 3

| Module | Factory Equipment use of the Module |
|---|---|
| Services | Overall registry of the location for all services. All service requests come through this module and are directed to the appropriate location for the actual instance of the service desired. |
| Profile | Maintains machine version, manufacturer information, model number, SKU, installed options, owner history, etc. |
| Usage | Maintains a usage counter for the machine, tracks work history and usage history |
| Maintenance | Records all machine repair history, when failures are reported and fixed or when regular tune-ups are performed |
| Health | Tracks and gives real time information about the various parts of the machine. It is the first service to detect any faults generated. |
| Location | Keeps location information of the machine with respect to the factory floor maps and adjacent machines. |
| Schedule | Maintains and schedules regular upkeep for the machine. Records scheduled machine uptime and downtime. |
| Family | Tracks relationships between the machine and other machines that it interacts with. |
| Security | Maintains data sharing rules for the content bank, user roles, access rights, etc.; whether the item can be serviced by particular individuals, who has access to the equipment |
| Alerts | Sends event-triggered alerts to neighboring machines and machine owner. Events may comprise completion of a task or occurrence of component failure. The messages are tailored to the targets based on their role templates and channels of communication. |
| Contacts | Maintains contact information for the factory owner, repairman, backup repairman, equipment manufacturer. |
| Logs | Keeps access logs of any transactions made between services or between a service and an external agent. |
| Bill of Materials | Maintains a hierarchical listing of all the parts of the machine, including hardware and software components. |
| State | Tracks the real-time state of the machine and what activity it is currently performing. |
| Documents | Manages manuals, blueprints, specifications, warranty information corresponding to equipment. |

The content bank 204 may also comprise a variety of object data modules for creating, delivering and processing enhanced object-related information (data). The creation and use of enhanced data in the context of content networks is more fully described in U.S. patent application Ser. No. 09/817,917. In general, enhanced object-related information is the result of any discrete data component that has had value-added attributes or information (i.e., contextual information) added thereto. In the context of the present invention, any discrete component of object-related information is any uniquely identifiable piece of object-related data or information that can be digitally represented and stored. Enhanced object-related information relating to objects may be based on virtually any attribute or characteristic of an object, which enhanced object-related information is thereafter available for use by other entities and services. For example, an object may provide discrete data, such as error codes. Related contextual information may include the object's prior maintenance history and location. Enhanced object-related information may include the error codes as well as the object's prior maintenance history and location. After receiving one or more error codes from an object, a content bank may generate and transmit enhanced object-related information to a service network. A technique for creating enhanced object-related information is further described below with reference to FIG. 4.

Referring again to the object data modules shown in FIG. 3, a translation module 336 may be included to convert raw data to a common representation format, such as XML-encoded data. The translated data or discrete components may then undergo transformation processing by a transformation module 338 to add contextual information to the translated data. Furthermore, the translation module 338, operating in accordance with the access rules and role templates maintained by the security module 324, may operate upon the translated data at the time of delivery to one or more third parties in order to ensure the proper types and amounts of data are delivered to the respective third parties. A rendering module 340 may determine an appropriate format (e.g., XML, Hyper Text Markup Language (HTML), Wireless Markup Language (WML), etc.) necessary to transmit enhanced object-related information to an entity or service. The determination may include retrieving information from a database that associates preferred formats with individual entities. The rendering module 340 may utilize one or more Extensible Stylesheet Language (XSL) stylesheets to determine how XML-encoded content is to be presented. Additionally, or in the alternative, the rendering module 340 may use one or more Document Object Model (DOM) interfaces that allow developers to create applications and scripts to access and update the content, style, and structure of XML-encoded content.

An aggregation module 342 may be included to aggregate information obtained from a plurality of objects or entities or both. In one embodiment of the invention, aggregation includes a process whereby discrete data and its accompanying contextual information are gathered together according to one or more aggregation rules. The aggregation module 342 may be used to desensitize information. For example, the aggregation module 342 may obtain sensitive information relating to objects owned or operated by competing entities, such as object usage and failure data. The sensitive information may be averaged according to an aggregation rule and transmitted to all of the entities. Aggregation may be used to provide information to entities without revealing sensitive information of any one particular entity. It should be noted that the databases 346 may also be used to store data processed by the object data modules.

As noted above, the content bank 204, via an instance of the family module 322, may also be configured to track hierarchical relationships between objects. For example, the content bank 204 may contain information indicating that a particular shipping container object is aboard a particular truck object. Knowing the hierarchical relationships between objects allows the content bank 204 to add additional contextual data to enhanced object-related information. With respect to the shipping container object, knowing that the container object is aboard the truck object, allows content bank 204 to determine the location of the shipping container object based on the location of the truck object. Hierarchical relationships may also be utilized as part of access rules. For example, if a particular entity or digital identity instance is authorized to access enhanced object-related information relating to a truck object, the entity or digital identity instance may also have access to enhanced object-related information for component objects of the truck object. Of course, access and usage rules may have any number of rules allowing entities and digital identities to access or use enhanced object-related information and some, none or all of the rules may be a function of the hierarchical relationship between objects.

The interfaces, modules and databases shown in FIG. 3 are examples of the type of components that may be included as part of a content bank. Additional and/or alternative interfaces, modules and databases may also be included. In an alternative embodiment of the present invention, the functionality of the content bank may be extended through the use of one or more of the modules or components described in related U.S. patent application Ser. No. 09/817,917 with regard to the digital persona taught therein. In particular, the digital persona taught in U.S. patent application Ser. No. 09/817,917 may be used to enhance the capabilities of the instant invention, particularly the object identity modules, to discover and interact with other sources of enhanced object-related data.

Figure 3A:
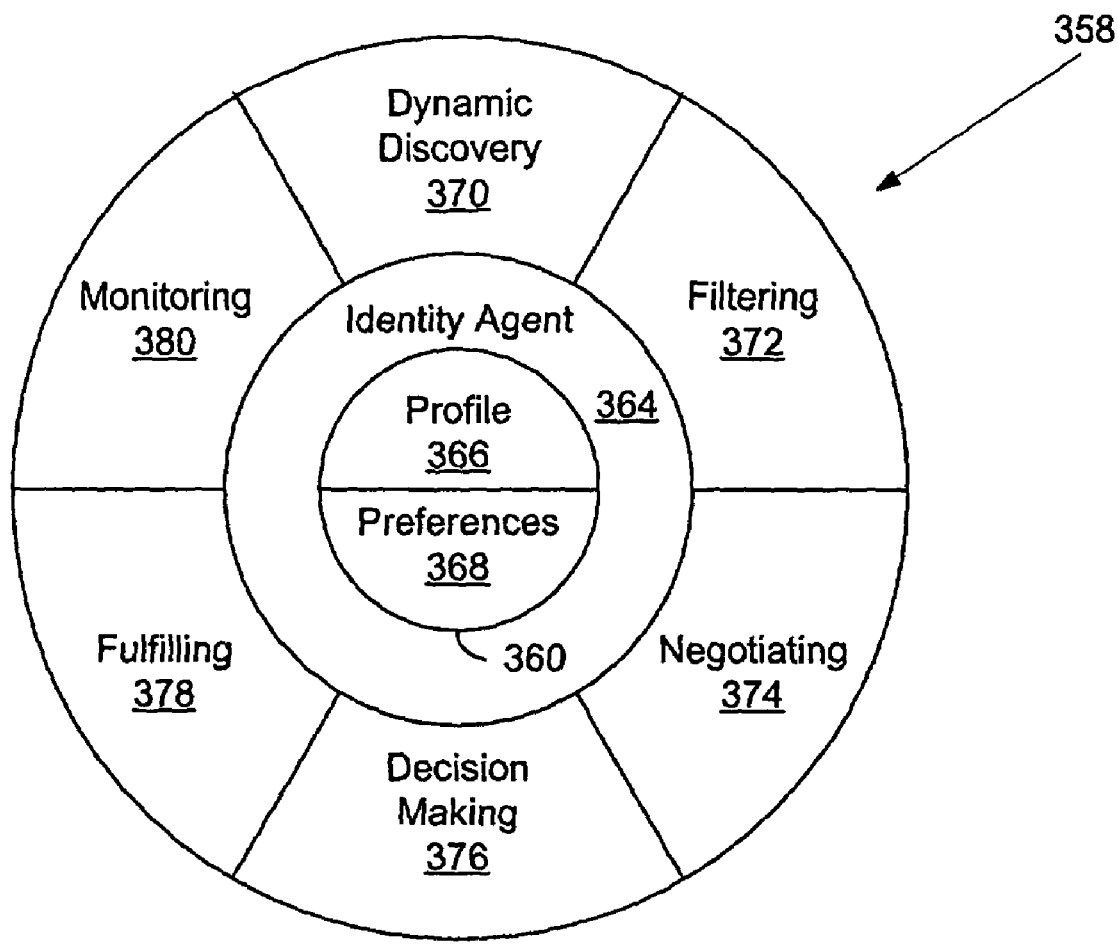
FIG. 3A is a schematic illustration of a digital identity in accordance with an embodiment of the present invention.

Referring now to FIG. 3A, a schematic illustration of a digital persona 358 is illustrated. In the context of the present invention, a digital persona models, or acts as a proxy for, an object using stored identity information 360. Based on the stored identity information 360, a set of services act as the intelligence whereby the digital persona 358 interacts with third parties. An identity agent 364 controls access to and modification of the stored identity information 360. Preferably, the stored identity information 360 resides in a database, and identity agent 364 is implemented as a one or more software routines executed by a computer or similar platform controlling access to the database. In general, the functionality of the object identity services described above would be implemented in whole or in part by the identity agent 364 and the stored identity information 360. As shown, the identity agent 364 has access to a set of services 370-380. The set of services 370-380 are preferably implemented as one or more software routines executed by the same or a similar computer platform.

As shown in FIG. 3A, the stored identity information 360 comprises an entity's profile information 366 and preference information 368. The profile information 366 embodies information regarding current and historical actions and attributes of the corresponding object. For example, the profile information of a truck may contain product identifying information and the current condition of the truck. The preferences information 368 may represent preferred services, applications, contacts or other information. For example, a preference for a truck object may include a preferred service network or preferred fuel.

The set of services 370-380 preferably includes six different services, dynamic discovery, filtering, negotiating, decision making, fulfilling and monitoring. For the sake of simplicity, the one or more interfaces between the set of services and third parties (e.g., other digital identities) are not shown in FIG. 3A. A dynamic discovery service 370 manages incoming requests from third parties, which requests may comprise requests for enhanced object-related information controlled by the digital identity. The dynamic discovery service 370 receives content that includes the terms of new services or data from other entities, digital identities or others and updates the status of existing services of third party providers. When new services are found, or the status of existing services is updated, the profile or preferences information included in the stored identity information 360 may be updated accordingly.

A filtering service 372 identifies services and content (preferably, another object's or entity's enhanced object-related information) that will be of interest to its corresponding object based on the stored identity information 360. In this manner, the digital persona 358 may request content from third parties and only use that content that meets some predefined rule or rules. For example, a computer object may be interested in receiving, from a computer parts supplier, data relating to parts that make up the computer. Examples of techniques for implementing such filtering are known in the art as exemplified, for instance, through the customization rules used by websites such as Yahoo and Excite.

A negotiating service 374 may confer with services, digital identities or other objects to establish terms for a desired transaction. In the context of the present invention, such negotiations would occur where, for example, a given digital identity instance seeks to obtain an object's content but must first negotiate with that object's digital identity instance in order to obtain it. Because preferences information 368 for an object can include that object's desires regarding how negotiations with others should proceed, in some embodiments, the negotiating service 374 can operate automatically and autonomously. In one embodiment of the invention, negotiations are performed by matching of parameters. Negotiations may be based on multiple parameters and some of the parameters may be inferred from profile information 366 and/or preference information 368.

A decision making service 376 automatically determines whether terms supplied by negotiating service 374 are acceptable based on preferences information 368. Techniques for making such decisions are currently known in the area of automated trading, for example, where criteria regarding price or market conditions may be established such that transactions occur when one or more conditions are satisfied. As a further example, on-line auction services such as eBay or Amazon or business-to-business (B2B) exchanges such as ChemConnect allow the use of reserve prices and limit prices to automatically accept/reject bids. Those having ordinary skill in the art will recognize that these technologies may be readily adapted for the purposes of the present invention.

A fulfilling service 378 enables agreed upon transactions to be executed by digital identity 358, and arranges for delivery of services, objects or content based on the profile information 366 and/or preference information 368. For example, where digital persona has agreed to purchase access rights to a given object's data, the fulfilling service 378 may provide the necessary financial data required to complete the transaction. Furthermore, the fulfilling service 378 may also provide the supplier with the necessary information to deliver the data, such as location information of the digital persona's instance of the services module previously described. In one implementation, the fulfilling service 378 would be similar to a service that uses PayPal for financial settlement and then initiates an ICE (Internet Content Exchange) message to arrange the delivery terms of the data.

Finally, a monitoring service 380 observes, but may not participate in, activity by digital identity 358. The monitoring service 380 can then either recommend changes to the profile information 366 or the preferences information 368 due to observed trends in the activity, or automatically effectuate such changes. For example, if the monitoring service 380 notices that an airplane object has had its tires replaced every six months over an extended period of time, the profile information 366 can be updated to reflect the airplane object's likely need for new tires every six months. Further still, the monitoring service 380 may perform scenario tracking in order to ensure that the proper profile information 366 and preference information 368 are used. This may be accomplished by determining factors such as an object's location, the current time, other entities in the proximity, predetermined schedule and current task in which the entity is engaged.

In the previous discussion of FIG. 3A, the set of services 370-380 associated with the digital persona have been described as being apart from, or in addition to, the object identity services 310-332. However, in practice, it is anticipated that one or more of the object identity services 310-332 could be merged into one or more of the digital persona's services 370-380. For example, as described above, the alerts service 326 and usage service 312 could be implemented as part of the monitoring service 380.

Figure 4:
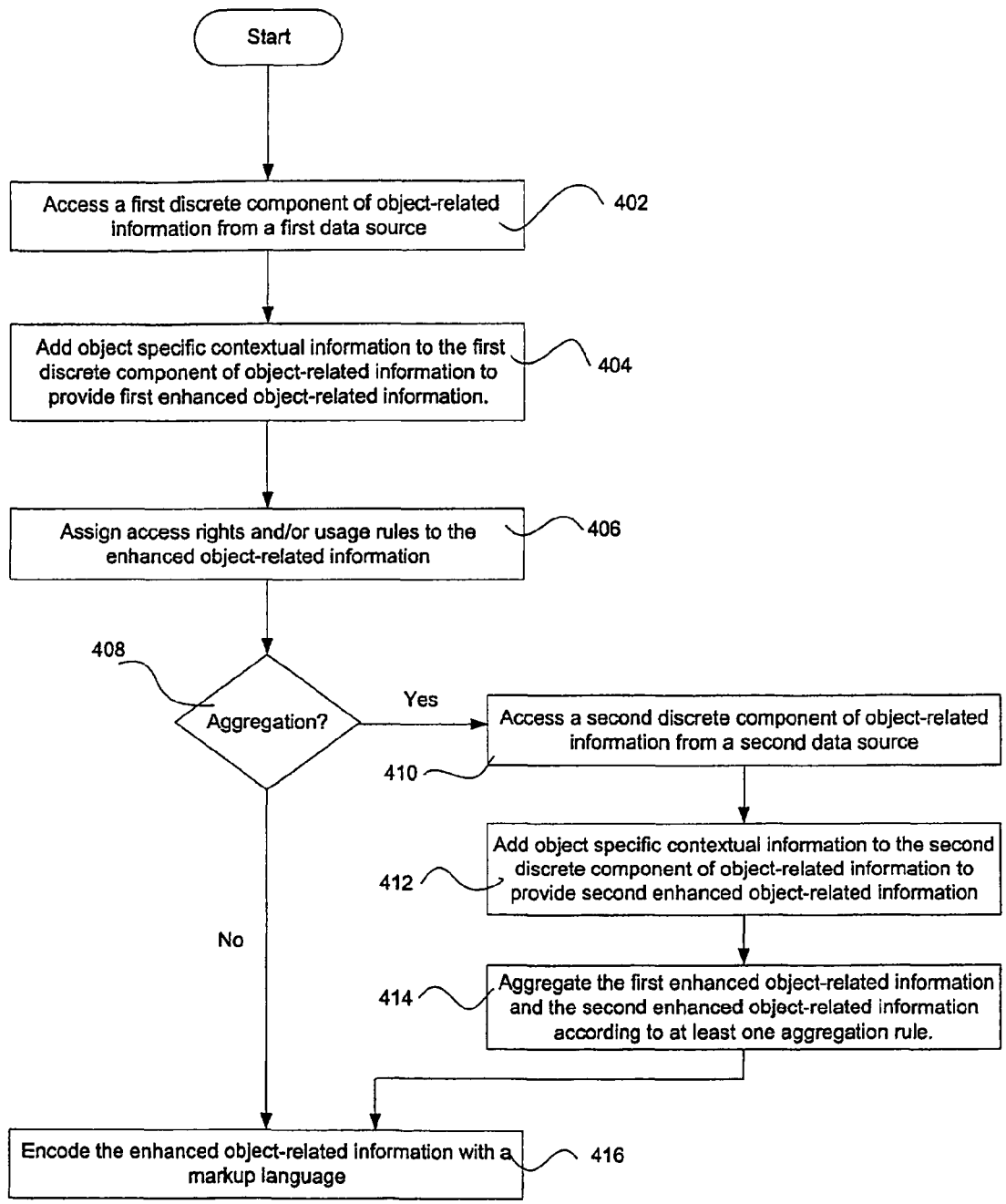
FIG. 4 is a flowchart of a method for associating contextual information with discrete components of object-related information in accordance with an embodiment of the present invention.

As noted above, object-related data in the form of enhanced object-related information may be provided for use by other entities or services that interact with a given object or objects. FIG. 4 illustrates a method of creating enhanced object-related information in accordance with an embodiment of the invention. In a presently preferred embodiment, the processing illustrated in FIG. 4 is performed by one or more of the object data modules illustrated in FIG. 3. At block 402, a first discrete component of object-related information originating at a data source is accessed. For the purposes of the present invention, "accessed" means data that is pushed by the data source or pulled by a digital identity instance. The processing performed at block 402 may be performed by a digital identity instance, as described above, and the data source may be an object, entity or other source. The discrete component of object-related information may include at least one attribute of the object.

Next, at block 404, object-specific contextual information is associated with the discrete component of data to provide enhanced object-related information. In a preferred embodiment, the contextual information is associated with the information through XML coding of the data. In practice, such coding can be appended directly to the data or it may reside apart from the data and linked in a logical manner (i.e., through a pointer) to the data. In the latter case, the XML coding can be merged with data at the time of delivery. At block 406, access rights and/or usage rules may be assigned to the enhance object-related information in step 406. Once again, such access rights and usage rules may be appended directly to the data or may be logically linked thereto. In general, the access rights and/or usage rules comprise policies about who can access the data, the length of time the data can be stored, how the data may be shared with other parties and what such other parties can do with the data. For example, a given entity (e.g., an insurance company) may have access to a person's usage data of his or her car. However, the insurance company may obtain that usage data only up until that time when the person's insurance coverage with that insurance company expires as determined, for example, by the termination date of a given policy. Of course, other examples will be readily apparent to those having ordinary skill in the art.

At block 408, it is determined whether or not the enhanced object-related information will be aggregated. When it is desired to aggregate the enhanced object-related information, a second discrete component of object-related information is accessed from a second data source at block 410. The object specific contextual information is added to the second discrete component of data to provide second enhanced object-related information at block 412. Then, at block 414, the first enhanced object-related information and the second enhanced object-related information are aggregated according to at least one aggregation rule. The aggregated object-related information may be in the form of new enhanced object-related information. Finally, the enhanced object-related information is encoded with a markup language at block 416 and may be transmitted to an authorized entity. Note that the markup encoding performed at block 416 is performed on the complete set of data to be delivered, whereas the encoding at block 404 is performed upon discrete components of data that would make up the complete set of data to be delivered.

Generally, an aggregation rule states what data is to be aggregated together for a given set of circumstances. For instance, if a manager of a fleet of trucks asks for usage data (e.g., engine temperature data) for a given date range, the aggregation service queries the usage service for the relevant data points (i.e., within the date range). The data points are thereafter combined and presented in a single XML string.

An additional type of aggregation is multiple object aggregation. For instance, assume a manufacturer of truck engines wants to know why its engines are overheating. The manufacturer's digital identity instance can query the digital identity instances of its customers for all engine temperature data of trucks where there exists aberrations (i.e. where temp has gone above acceptable levels). Additionally, the manufacturer can ask for contextual data for each data point, such as the speed that each truck was going at the relevant times. The manufacturer can also ask for contextual data that is relevant to the entire request like that trucks' typical route data (Miles per route, Geography, etc.). Once this information is obtained for each truck, it is aggregated together and presented as a single data string.

Figure 5:
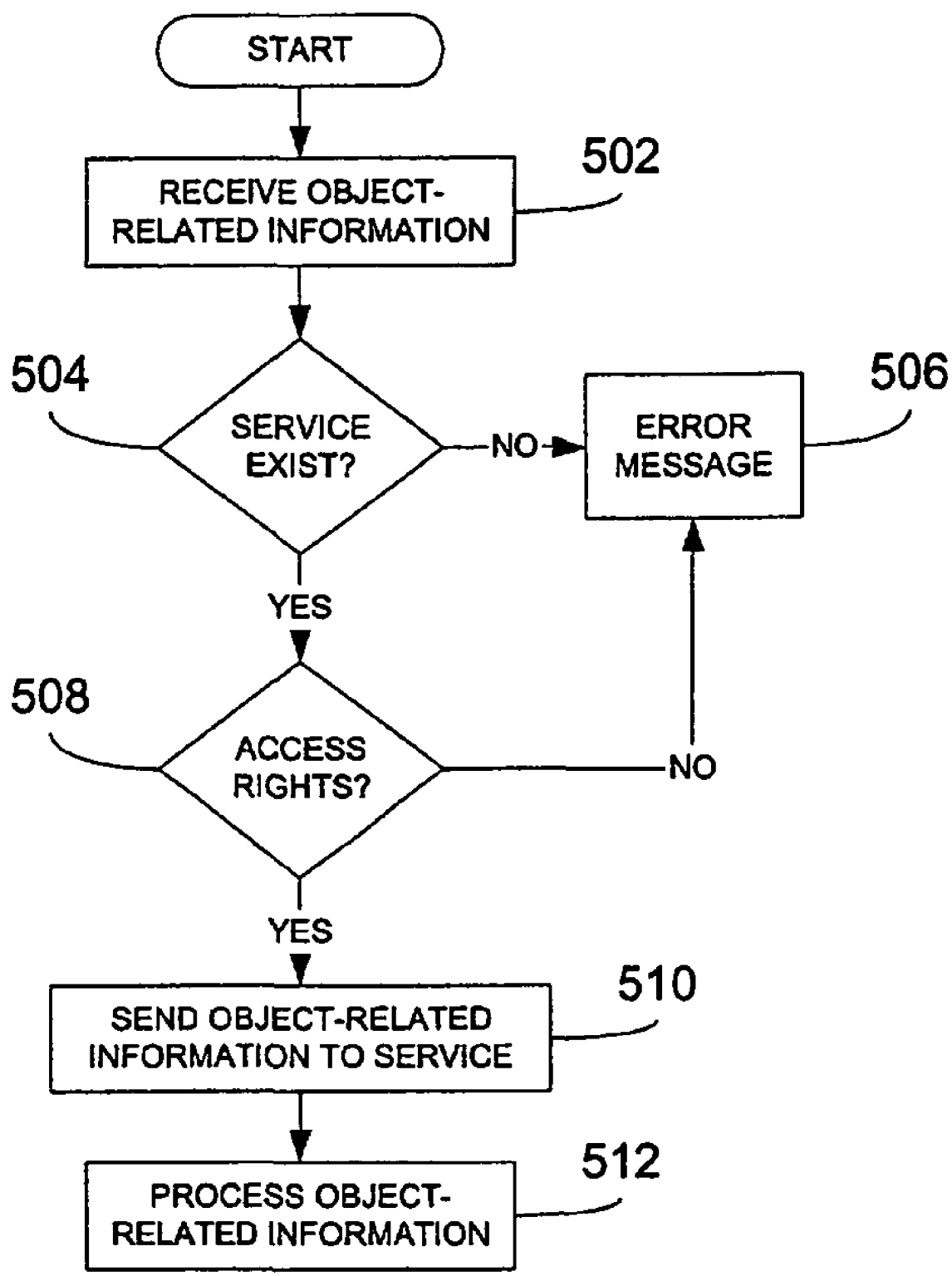
FIG. 5 is a flowchart of a method for receiving object-related information by a digital identity from a source in accordance with an embodiment of the present invention.

Referring now to FIG. 5, a method for receiving object-related information is illustrated. At block 502, a digital identity instance receives the object-related information from a source. In practice, the source may comprise virtually any type of entity that may wish to interact with an object. Furthermore, the type of object-related information may comprise any information concerning an object. For example, the object-related information may comprise information regarding the profile of an object, a location of the object, etc. Further still, the object-related information may take any format, preferably digital, such as text, audio or image data. In order to ensure that the object-related data is sent to the digital identity instance for the object, the source may rely on a unique identifier associated with the object in question. For example, using the EPC/ONS system previously described, the source may send the EPC for the object to a resolution service maintained by the ONS. The ONS, in turn, resolves the EPC to provide specific location information for the instance of the necessary service or services for the object. Once again, note that the use of EPC/ONS is but one implementation that may be used for this purpose, and the present invention is not limited in this regard.

In a presently preferred embodiment, communications may be established with a given digital identity instance through one or more access modes available via a multi-mode interface. As illustrated in FIG. 3, each content bank implements one or more interfaces 302-308 which thereby support the multi-mode interface. A variety of modes, such as text, voice and/or images, as supported by the appropriate interfaces 302-308, may be used to communicate with the digital identities. Furthermore, specific mode protocols may be used, such as a SOAP-based access mode, an Instant Messaging-based access mode, HTTP, etc. In short, virtually any type of access mode through which object-related information may be conveyed can be used in conjunction with the present invention as a matter of design choice.

Regardless, the object-related information is received by the digital identity instance via the associated service module instance. As noted above, the service module instance serves as the registry for the digital identity instance and determines which service the object-related information needs to be sent to. To this end, at block 504, it is determined (by the services module) whether the targeted service exists or not for this digital identity instance. If not, an error message is generated at block 506 and sent to the source of the object-related information. The services module may have direct knowledge of the existence of a service (for example, where service is implemented in the same content bank system as the services module itself) or may be use the above described mechanism (e.g., EPC/ONS resolution) to determine if the service exists. Once it is determined that a service exists, either locally or remotely, the services module instance may update itself accordingly.

If the relevant service does exists, processing continues at block 508 where the digital identity instance, via its corresponding instance of the security module, determines whether the source of the object-related information has sufficient access rights to allow it to provide information regarding the corresponding object. Techniques for designating access rights and for determining whether such access rights allow an entity to engage in a certain action are well known in the art and need not be described in greater detail herein. If the source does not have sufficient access rights, an error message is generated and sent at block 506.

If sufficient access rights are available, processing continues at block 510 where the object-related information is sent to the targeted service by the service module. In this regard, note that the targeted service does not necessarily have to be co-resident with the service module. Although the service module and target module may reside with the same content bank, it is possible that the targeted module may reside in a different content bank. In this case, the service module can cause the object-related information to be sent to the appropriate content bank by first determining location information for the module and sending the object-related information based on the location information. Additionally, the conveyance of the object-related information to the targeted service may be achieved in any convenient manner. For example, if the quantity of data is sufficiently small, the actual data itself may be sent to the service at block 510. Alternatively, and particularly in the case where the quantity of data is relatively large, a pointer to the object-related information may be sent to the service such that the service may fetch the information on its own. Regardless, the object-related information is processed by the targeted service module at block 512 as needed. In this context, the "processing" performed by the targeted module may comprise virtually any type of actions that may be performed on the object-related information. For example, the processing described above relative to FIG. 4 may be performed. Regardless, the object-related information is thereafter available via the digital identity instance and the content bank.

Figure 6:
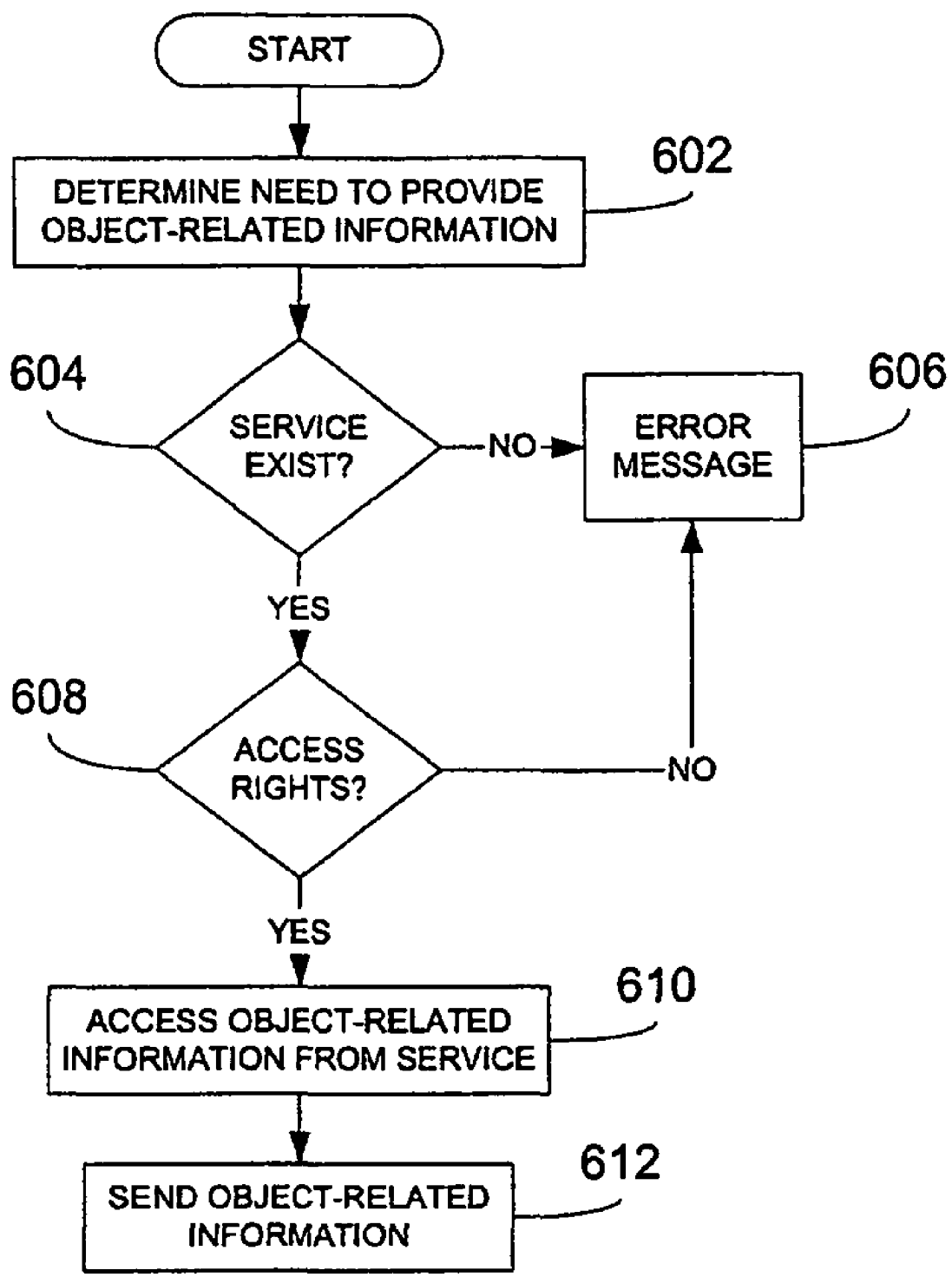
FIG. 6 is a flowchart of a method for sending object-related information by a digital identity instance to a third party in accordance with an embodiment of the present invention.

Referring now to FIG. 6, a method for providing object-related information is illustrated. At block 602, a digital identity instance determines that the object-related information corresponding to a given object needs to be provided to a third party, i.e., some entity other than the object itself. In practice, this determination may be the result of a "pull" operation (i.e., in response to a request) or a "push" operation (i.e., in response to an event or trigger without a request). In the pull scenario, a third party may simply request the information for itself or another third party, which request is received by service module. In the push scenario, one of the object identity modules (e.g., the health 316 or usage 312 modules) may become aware of a condition which requires notification of a third party. The ability to push object-related information to third parties gives rise to subscription scenario which a given entity may subscribe to a particular service. For example, a person might want to subscribe to information regarding the location of an object owned by another person. To this end, that person would send a subscription request to the digital identity instance corresponding to the object, which subscription request manifests the person's desire to receive updates regarding the location of the object. Where the desired information is to be provided on a payment basis, the subscription request may include credit information and the like needed to provide for such payments. Techniques for establishing such subscriptions to automatically receive updated information (for example, via email over a public network such as the Internet) are well known in the art. Whenever a change in location for that object occurs and is detected, the subscriber is thereafter notified accordingly. In this manner, the need to constantly poll is eliminated and allows the object's digital identity instance to push the information to the subscriber.

Regardless, once it is determined that object-related information needs to be sent to a third party, processing continues at step 604 to determine if a service (module) associated with the needed type of object-related information exists. If not, an error message is sent at block 606. If the service does exist, it is determined, at block 608, whether the third party has sufficient access rights to receive the object-related information. If so, processing continues at block 610 where the object-related information is accessed via the appropriate service. Because the appropriate service may not reside in the same content bank as the services module, access may have to be achieved via another content bank. Furthermore, even if the appropriate service module resides in another content bank, it is possible that the necessary object-related information will reside in yet another content bank. Regardless, at block 612, the necessary information is sent by the service (preferably via the alerts service 326) to the third party based on location information for the service. In a presently preferred embodiment, an instance of the rendering module 340 may process the object-related information into an appropriate form specific to the third party to which the object-related information is being sent.

Figure 7:
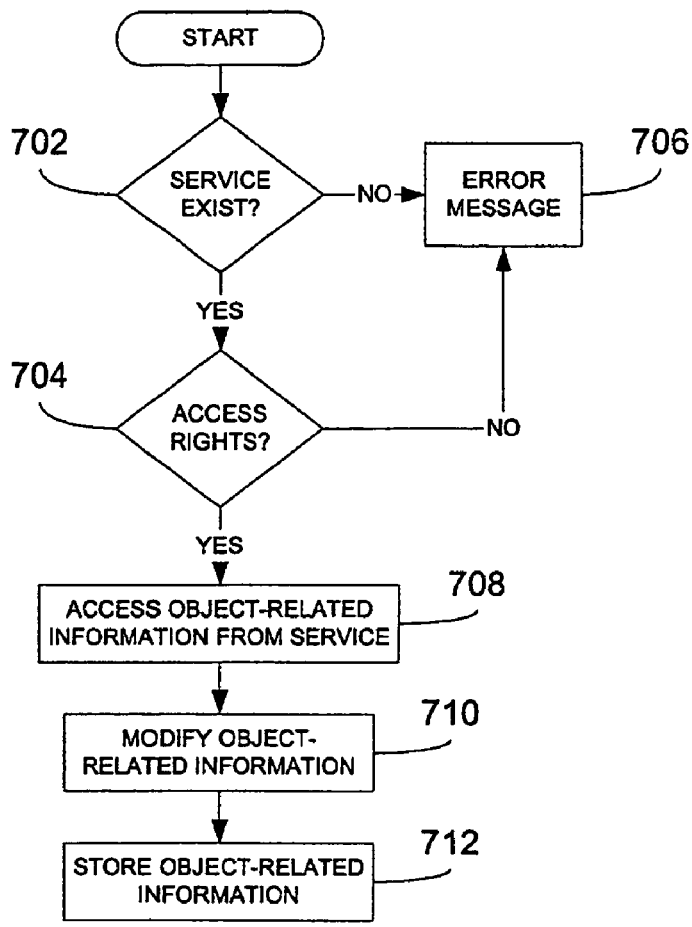
FIG. 7 is a flowchart of a method for modifying object-related information by a digital identity instance in accordance with an embodiment of the present invention.
Figure 8:
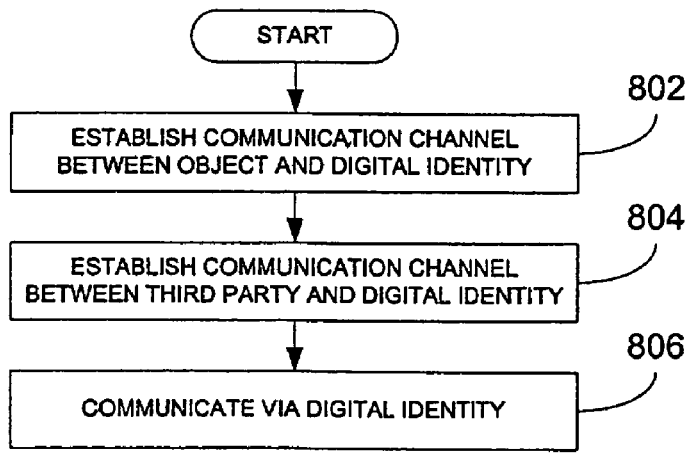
FIG. 8 is a flowchart of a method whereby a third party may communicate with an object via a digital identity instance in accordance with the present invention.
Figure 9:
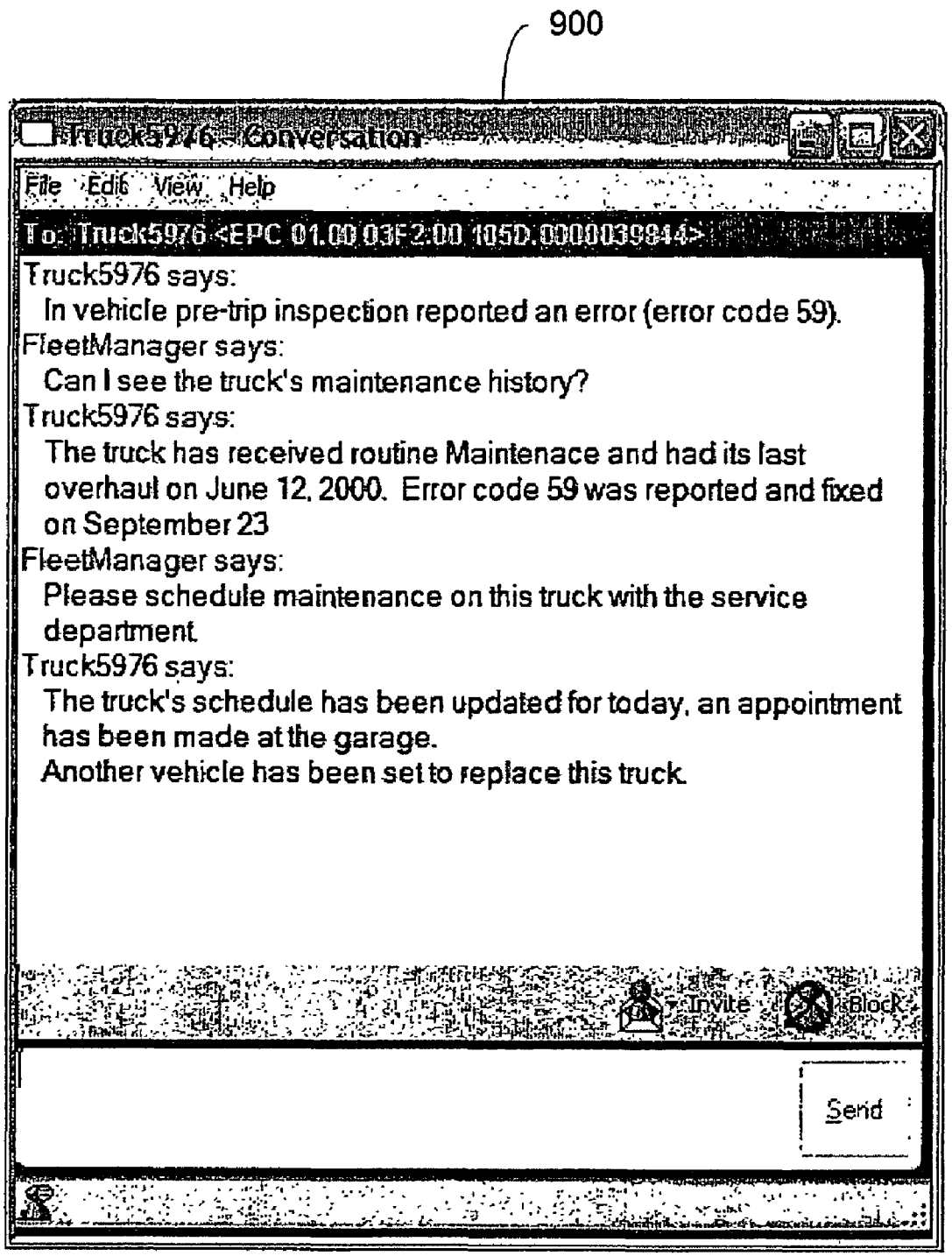
FIGS. 9 and 10 illustrate an exemplary interface mode in accordance with the present invention.

Referring now to FIG. 7, a method for modifying object-related information is illustrated. In particular, at block 702, it is first determined whether a given service exists for the digital identity instance associated with a given object and, if so, where the service resides. If the service exists, it is determined if access rights are available to allow the object-related information to be modified. Assuming such rights are available, processing continues at block 708 where the object-related information is accessed. Again, location information is obtained designating the particular location of the relevant service. Thereafter, at block 710, the object-related information is modified as needed by the relevant service. For example, rights to the data may be changed, translations of the data may be performed or the data may be aggregated with still other object-related information. Regardless, processing continues at block 712 where, after the object-related information has been modified, it is stored as needed by the service such that it is subsequently available via the digital identity instance and the content bank.

A particular example of the use of a content bank as described above will further illustrate the features of the present invention. To this end, assume an excavator machine is being used at a construction site. Via an electronic control module (ECM), the excavator detects that its alternator is not functioning properly and decides that it should shut down within 5 minutes to limit the amount of damage. A device incorporated into the excavator monitors error codes being generated by the ECM and detects the fault. The device sends an emergency message to the excavator's operator and concurrently sends, via a wireless radio network or a packet data network, information regarding the fault to a content bank hosting the excavator's digital identity. In particular, the information regarding the fault is sent to the excavator's health module (or service). The message sent to the health module is preferably in XML format encapsulated in a SOAP package. It contains information such as description of the emergency, the defunct part, potential causes for the failure, etc.

The health service logs the message and notes the excavator's unavailability. It notifies the usage service to stop the usage counter until repairs are done. It would also notify the state module to update the relevant state data. All notifications within the content bank are in the form of a SOAP package using XML. The health service forwards the message to the maintenance service relaying the faulty part information. The maintenance service has rules to determine the course of action based on the type of repair required. It contacts the profile service to get warranty information for the excavator. If the repair part is under warranty then the maintenance service initiates a process to contact the manufacturer for a replacement part. If the repair part is not under warranty, the maintenance service must notify and get approval from the construction site's manager to start the repair process. For the remainder of this example, it is assumed that the part is not under warranty.

The maintenance service notifies the alerts service to send notification to the site's manager with a request for approval to do the repairs and awaits approval. The alerts service gets the contact information about the manager from the contacts service and sends a notification to the manager. This notification can be sent via email, short message service (SMS), instant messaging, etc. Some time later, the alerts service receives the requested approval from the manager and passes it on to the maintenance service. The approval can be received in the form of an email, SMS or an instant message, for example.

The maintenance service implements logic that allows it to determine the preferred repair agency based on the type of repair, cost, etc. It determines the repair agency to be contacted, gets the location of the machine from the location service and sends this information in a service order request to the alerts service. In turn, the alerts service gets contact information about the repair agency from the contacts service and sends a notification to the repair agency's scheduling system.

A user interface via a personal digital assistant (PDA), computer or other device allows a user to access the object-related information provided by the various services, subject to access rights maintained by the excavator's instance of the security service. To this end, a technician accesses the content bank via a PDA and after authenticating himself, will have access to retrieve the relevant fault data and excavator information using the health, usage and maintenance services, for example. The technician performs the repairs on the machine and updates the maintenance service with details of the maintenance performed.

Thereafter, the object sends a message to the health service indicating that the alternator is repaired and that the excavator is available for use again. The health service notifies the usage service to resume usage counter operation. The health service sends a message to the alerts service asking it to notify the site manager of the excavator's health and availability. The alerts service again retrieves the manager's contact information from the contacts service and sends a notification to the manager via any of email, SMS, instant message, etc. Additionally, any interaction between the content bank and the excavator, between services, or the content bank and any external entity is logged within the content bank and is accessible via the logs service.

As the above example demonstrates, the content bank for objects creates value for all entities within the supply chain. As a result of the content bank, the excavator owner enjoys decreased downtime through automated repair scheduling, reduced repair/maintenance costs, maximized usage of employees time, decreased risk through object shutdown and increased tracking of product usage through maintenance tracking. Furthermore, the manufacturer of the excavator, if granted the appropriate access rights, now has the ability to draw new insights from mining real-time data of excavator usage, maintenance, and health, to increase understanding of its products through failure reporting thereby improving updated models and to automate warranty policy enforcement. Further still, providers of service to the excavator, again assuming appropriate access, can automate asset tracking for product and parts replacement, improved utilization of assets and people through automated scheduling and enhance service through context sensitive experience logs at the time of repair.

Another advantage of the present invention is that it facilitates direct communication with objects. That is, it is not only possible to send/receive information about an object using a content bank in accordance with the present invention, it is possible to effectively communicate with the object via its digital identity instance. This is further illustrated with reference to FIG. 8. At block 802, a first communication channel between an object and its digital identity instance is established. The nature of the first communication channel will necessarily depend on the type of object. For example, a vehicle currently in service (i.e., in transit) would likely have to use a wireless channel to communicate with its digital identity. Conversely, a relatively static medical device in a hospital (e.g., an x-ray machine) could use a landline-based channel.

Regardless, at block 804, a third party, wishing to communicate with the object, establishes a second communication channel with the object's digital identity instance. Again, the nature of the second communication channel is dependent upon the particular type of third party attempting to contact the object. In one embodiment, a digital identity instance corresponding to a second object may communicate with the digital identity for the first object. In this case, if the first and second digital identities reside within the same content bank, the second communication path will likely be internal to the content bank.

Once the communication paths have been established, communications between the third party and the object via the object's digital identity instance occurs at block 806. With the digital identity instance acting as a go-between, messages to and from the object may occur in essentially real-time. An example of this is illustrated below with respect to FIGS. 9 and 10, in which communications with a truck are conducted through an instant messaging interface 900. In the example shown in FIGS. 9 and 10, a manager of a fleet of trucks and a service manager for one of the trucks is able to communicate directly with one of the trucks, in this case identified as "Truck5976". Beginning with FIG. 9, it is assumed that the truck runs an automated pre-trip inspection using sensors throughout the truck. When an error is detected, the truck takes action to record the error and contact the assigned fleet manager detailing the problem. To this end, the health service is updated to indicate an error, the contacts service contains the fleet manager IM name, and the health service requests that the fleet manager be contacted through the alerts service.

The fleet manager is able to see a summary report of the maintenance that has been performed for the vehicle. This is accomplished by the IM virtual agent requesting the maintenance service to return the maintenance history for Truck5976 tailored for the fleet managers role and IM client. From this information, the fleet manager is able to determine that the truck should not continue its scheduled route, and instead informs the truck to schedule maintenance for itself.

Figure 10:
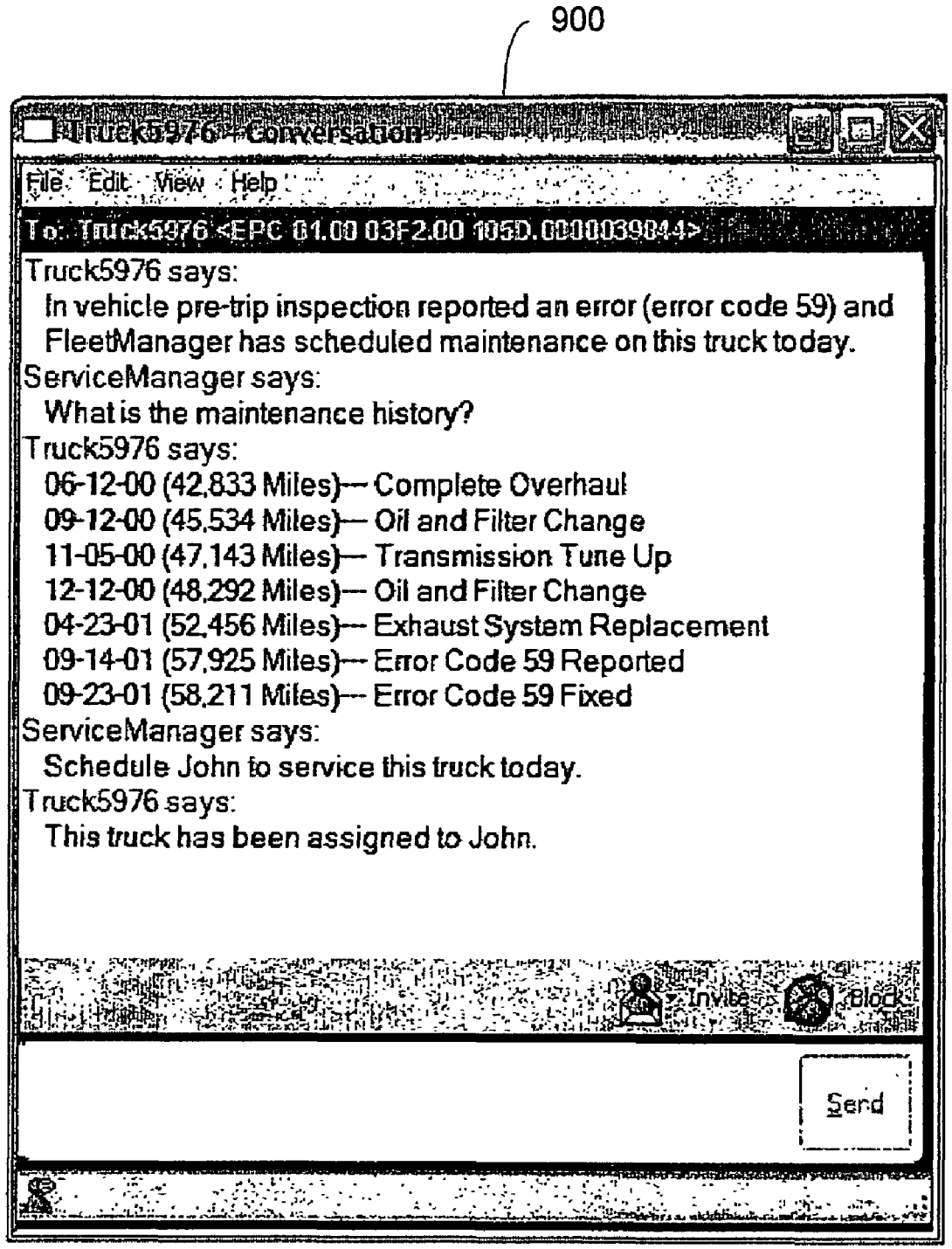

Referring now to FIG. 10, the truck alerts the service manager and checks the schedules of other trucks to find one that is available for replacement. The truck's schedule service is updated to indicate service instead of productive usage. Additionally, the IM application checks (via the same content bank for Truck 5976 or different content banks) the schedule service of all other trucks to find one whose location (as determined by its location service) is nearest Truck5976, whose health service indicates that the truck is in operating condition and whose profile service indicates enough capacity. Through the alerts service, the contacts service sends a request to Truck5976's service manager indicating a problem that requires attention today. The truck contacts the service manager with the error detail and authorization that the Fleet Manager has scheduled maintenance today. To this end, Truck5976's contacts service makes the request to alert the listed service manager through the alerts service and the appropriate object data modules tailor the message to the manager based on his role and usage needs. The service manager is able to see the detailed, line by line, maintenance history for the vehicle. Each user has a different view to the object data based on their context. This is handled when the maintenance service is requested to return the detailed maintenance for the service manager's role. Finally, the service manage informs the truck to check the calendar for "John" and add an appointment for it to be serviced by him.

While the embodiments described above illustrate generalized scenarios whereby object-related information is exchanged with third parties, those having ordinary skill in the art will recognize that the same concepts can be applied to a variety of situations. Indeed, the present invention greatly facilitates the management and distribution of object-related information. Furthermore, the present invention enables communications with objects in a fashion heretofore unavailable. In particular, digital identity instances as implemented by content banks in accordance with the present invention may be used as intermediaries when third parties and objects seek to communicate with one another. As a result, the present invention improves overall efficiency in dealing with such objects. This is accomplished through the provision of a content bank dedicated to the management of object-related information through the use of a variety of object identity modules and object data modules. While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. In a content bank system comprising at least one digital identity instance representative of at least one object, a method for manipulating object-related information regarding an object of the at least one object, the method comprising:

determining, via a services registry associated with a digital identity instance corresponding to the object, whether a service associated with the object-related information exists, wherein the service registry lists available services for the object based on at least one service module associated with the digital identity instance and wherein the digital identity instance acts as a proxy for the object and is defined by instantiations of the at least one service module;

when the service associated with the object-related information exists, accessing the object-related information via the service;

modifying the object-related information to provide modified object-related information; and sending the modified object-related information to the service such that the modified object-related information is subsequently available via the content bank system.

2. The method of claim 1, further comprising:

determining, via the services registry, location information regarding the service;

accessing the object-related information via the service based on the location information; and sending the modified object-related information to the service based on the location information.

3. The method of claim 2, wherein the location information corresponds to another content bank system.

4. A content bank system comprising at least one digital identity instance representative of at least one object device, the system comprising:

at least one processor; and memory, coupled to the at least one processor, comprising computer-executable instructions that, when executed by the at least one processor, cause the at least one processor to:

determine, via a services registry associated with a digital identity instance corresponding to an object, whether a service associated with object-related information exists, wherein the service registry lists available services for the object based on at least one service module associated with the digital identity instance and wherein the digital identity instance acts as a proxy for the object and is defined by instantiations of the at least one service module;

access the object-related information via the service when the service associated with the object-related information exists;

modify the object-related information to provide modified object-related information; and send the modified object-related information to the service such that the modified object-related information is subsequently available via the content bank system.

5. The system of claim 4, wherein the memory further comprises computer-executable instructions that, when executed by the at least one processor, cause the at least one processor to:

determine, via the services registry, location information regarding the service;

access the object-related information via the service based on the location information; and send the modified object-related information to the service based on the location information.

* * * * *